United States Patent

[11] 3,633,346

| [72] | Inventor | Thomas J. McMullen<br>810 Cromwell Avenue, St. Paul, Minn. 55114 |
|---|---|---|
| [21] | Appl. No. | 78,508 |
| [22] | Filed | Oct. 6, 1970 |
| [45] | Patented | Jan. 11, 1972 |

[54] SICKLE BAR MOWER
7 Claims, 7 Drawing Figs.

[52] U.S. Cl..................................................... 56/17.6, 56/11.8
[51] Int. Cl........................................................ A01d 35/00
[50] Field of Search............................................. 56/11.6, 11.8, 12.3, 15.3, 17.6

[56] References Cited
UNITED STATES PATENTS

| 2,251,637 | 8/1944 | Ronning | 56/12.3 |
| 2,335,541 | 11/1943 | Ronning | 56/12.3 |
| 2,508,561 | 5/1950 | Bayer | 56/11.8 |
| 2,515,343 | 7/1950 | Gravely | 56/17.6 |
| 2,530,732 | 11/1950 | Ronning | 56/15.3 |
| 2,631,422 | 3/1953 | Michaelson | 56/11.6 |

Primary Examiner—Russell R. Kinsey
Attorney—Merchant & Gould

ABSTRACT: A transmission housing, having aligned drive shafts mounting drive wheels at its opposite sides, carries a base member on the rear end of which is mounted a drive motor, and to the front end of which is secured mounting means for an output shaft for operating a reciprocatory sickle or cutter bar. A frame comprises a pair of laterally spaced elongated frame members having front end portions connected to the output shaft mounting means, rear ends providing handles, and intermediate portions rigidly anchored to the base member to provide a rigid structure.

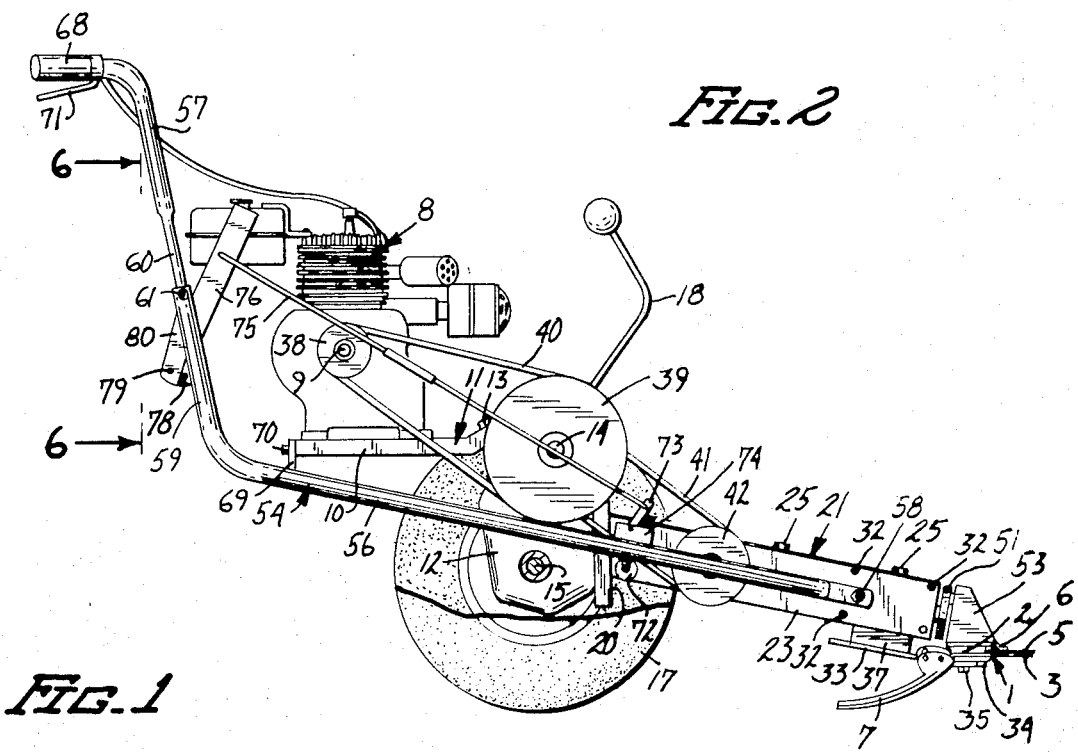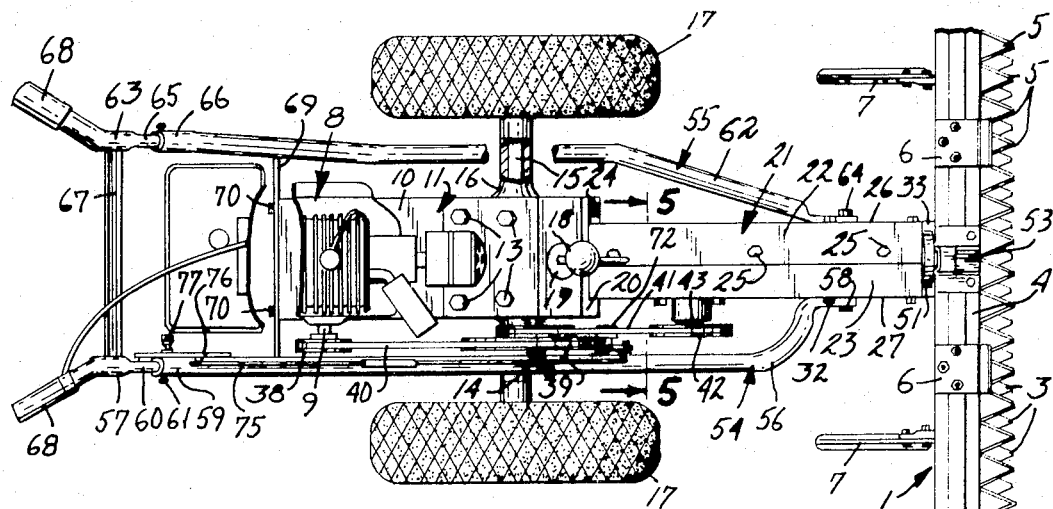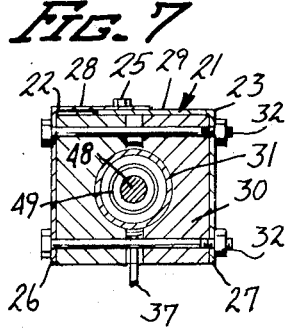

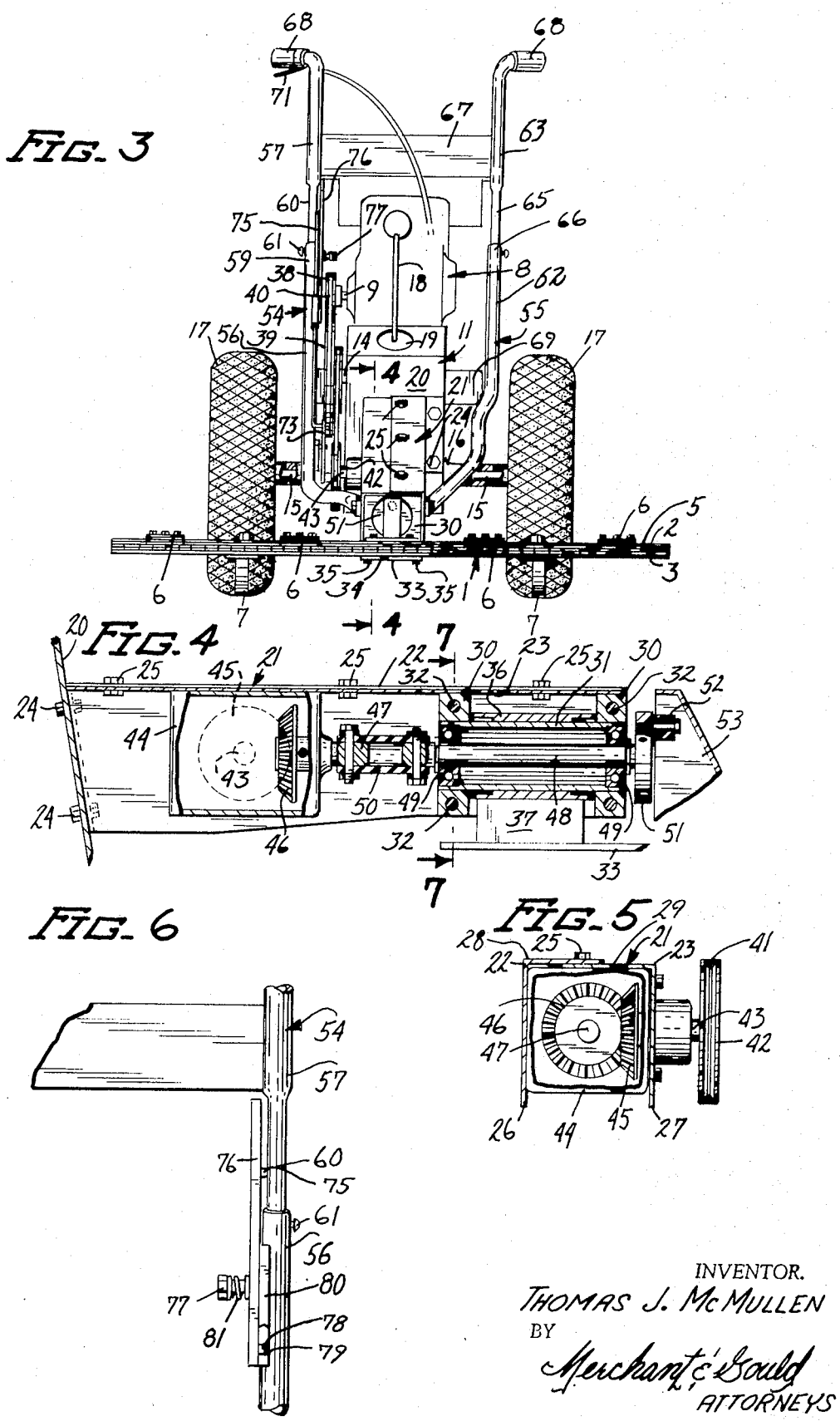

3,633,346

SICKLE BAR MOWER

BACKGROUND OF THE INVENTION

This invention is in the nature of an improvement on sickle bar mowers of the general type disclosed in U.S. Pat. Nos. 2,251,637, 2,335,541 and 2,530,732. The earlier mowers of this type performed satisfactorily as far as the mowing operation was concerned, but were somewhat awkward and cumbersome to drive and control as well as being expensive to build and difficult to maintain in proper operating condition.

SUMMARY OF THE INVENTION

In the present invention, a transmission housing journals a pair of aligned drive shafts mounting laterally spaced supporting and driving wheels. The transmission housing supports a base member on the rear end portion of which is mounted a drive motor and on the front end of which is mounted support means for a sickle and an output shaft for driving the reciprocating mower bar of the sickle. The transmission housing journals an input shaft that is parallel to the drive shaft of the motor and coupled to the motor drive shaft by a simple belt drive. An intermediate shaft is operatively coupled to the output shaft and is parallel to the input and motor shafts, being connected to the input shaft by a simple belt drive. A reinforcing frame comprises a pair of laterally spaced elongated frame members having front ends secured to the support means and secured intermediate their ends to the base member. The frame members extend rearwardly and upwardly terminating in handles for guiding the mower. Weight of the several parts is substantially equally disposed forwardly and rearwardly of the wheels, so that a nice balance and ease of handling is assured.

DESCRIPTION OF THE DRAWINGS

FIG. 1 is a view in top plan of a mower produced in accordance with this invention, some parts being broken away and some parts being shown in section;

FIG. 2 is a view in side elevation, some parts being broken away and some parts being shown in section;

FIG. 3 is a view in front elevation, some parts being broken away and some parts being shown in section;

FIG. 4 is an enlarged fragmentary section taken substantially on the line 4—4 of FIG. 3;

FIG. 5 is an enlarged fragmentary section taken generally on the line 5—5 of FIG. 1;

FIG. 6 is an enlarged fragmentary detail in rear elevation, as seen from the line 6—6 of FIG. 2; and FIG. 7 is an enlarged fragmentary section taken on the line 7—7 of FIG. 4.

DETAILED DESCRIPTION

The sickle bar mower of this invention utilizes a cutter assembly 1 of conventional and well-known construction, the same involving a mounting bar 2 on which is rigidly mounted a plurality of ledger plates 3 and on which is longitudinally slidably mounted a mower bar 4 which carries a plurality of sickles or knives 5. The knives 5 are held in overlying sliding engagement with the ledger plates 3 by the usual clips 6 that are bolted on the mounting bar 2 in the usual manner. A pair of ground-engaging skid elements 7 aid in supporting the cutter assembly in predetermined upwardly spaced relation to the ground.

Reciprocatory movement is imparted to the mower bar 4 and sickles 5 thereon by a motor in the nature of a conventional internal combustion engine 8 having a generally horizontally disposed output shaft 9 that extends transversely of the direction of movement of the machine and generally parallel to the longitudinal dimension of the cutter assembly 1. The motor 8 is bolted or otherwise rigidly mounted on the rear end portion 10 of an elongated base member 11 that is rigidly secured to the upper end of a power transmission housing 12 by means of bolts or the like 13. The housing 12 contains conventional gearing, not shown, but which may be assumed to be connected to an input shaft 14 that is journaled in the housing 12 on an axis parallel to the axis of the motor shaft 9. A pair of aligned output shafts 15, parallel to the input shaft 14, are journaled in bearing bosses 16 of the housing 12, and extend laterally outwardly of opposite sides of the housing 12. A pair of ground-engaging support wheels 17 are each mounted fast on a different one of the drive shafts 15 in the usual manner, and serve to propel as well as to support the mower. A gearshift lever 18 extends generally upwardly from the transmission housing 12 through an opening 19 in the base member 11.

The base member 11 is formed to provide a depending front end portion 20 that extends downwardly in front of the transmission housing 12 and to which is secured forwardly extending support means 21 for the cutter assembly 1. The support means 21 comprises a pair of elongated support brackets 22 and 23 the former of which is bolted to the base member front end portion 20, as indicated at 24, and the latter of which is rigidly secured to the bracket 22 by nut-equipped bolts or the like 25. As shown, the brackets 22 and 23 are cross-sectionally L-shaped to provide generally vertically disposed sidewalls 26 and 27 respectively and top walls 28 and 29 respectively, the top walls 28 and 29 overlapping and bolted together by the nut-equipped screws 25, see particularly FIGS. 4 and 5. A pair of split mounting blocks 30 are disposed in longitudinally spaced-apart relationship within the support means 21 and clampingly encompass the axially opposite ends of a rigid tubular sleeve 31, see particularly FIG. 4. Pairs of nut-equipped clamping bolts 32 extend transversely through the cooperating pairs of clamping blocks 30 and through openings in the brackets 22 and 23 to securely clamp the sleeve 31 and aid in strengthening the support means 21. The mower or cutter assembly 1 is supported from the support means 21 by a platelike skid member 33 having a forward end portion 34 that is bolted to the longitudinally central portion of the cutter mounting bar 2, as indicated at 35. A tubular hanger member 36 is journaled on the sleeve 31 between the blocks 30 and is provided with a depending web or the like 37 that is secured to the platelike skid 33 by welding or the like. With this arrangement, the mower or cutter assembly 1 is supported by the sleeve 31 for limited swinging movements on the axis of the tubular sleeve 31 and in a plane generally transversely of the machine to enable the cutter assembly 1 to follow uneven terrain.

Mower transmission connections between the motor shaft 9 and the mower bar 4 include a V-belt pulley 38 on the motor shaft 9, a double-groove pulley 29 fast on the input shaft 14 of the transmission within the housing 12, and an endless drivebelt 40 entrained over the pulley 38 and one of the grooves of the pulley 39 aligned with the pulley 38. A second endless V-belt 41 is entrained over the other groove of the double-groove pulley 39 and another V-groove pulley 42 that is mounted fast on an intermediate shaft 43 journaled in a gearbox 44 bolted or otherwise rigidly secured in the support means 21 toward the rear end thereof. A bevel gear 45 is mounted fast on the intermediate shaft 43 within the gearbox 44, and has meshing engagement with a cooperating bevel gear 46 mounted fast on a shaft 47 journaled in the gearbox 44 on an axis normal to the axis of the shaft 43 and extending generally longitudinally of the support means 21. An output shaft 48 is journaled in rolling friction bearings 49 mounted in opposite ends of the tubular sleeve 31 to dispose the output shaft 48 in concentric or coaxial relationship with the sleeve 31 and in alignment with the shaft 47. The inner end of the output shaft 48 is connected to the shaft 47 for common rotation therewith by a conventional flexible coupling 50, see FIG. 4. At its outer end, the output shaft 48 is provided with a crank 51 having a roller-equipped crankpin 52 disposed within and cooperating with a crosshead 53 rigidly secured to the mower or cutter bar 4 to impart reciprocatory movement to the mower bar 4 responsive to rotation of the output shaft 48.

A frame comprises a pair of elongated frame members 54 and 55 each disposed at an opposite side of the base member 10, transmission housing 12 and support means 21. The frame member 54 comprises a pair of sections 56 and 57, the former being bolted or otherwise rigidly secured at its front end to the bracket 23 as indicated at 58. The sections 56 and 57 are preferably tubular, the frame section 57 having an end portion 60 telescopically received in the upturned rear end portion 59 of the frame section 56 and locked in place by a pin or screw 61. In like manner, the frame member 55 comprises front and rear frame member sections 62 and 63, the front end of the section 62 being secured to the bracket 22 by a bolt or screw 64 opposite the bolt 58. The frame member section 63 is provided at one end with a reduced diameter portion 65 similar to the portion 60 for telescopic reception into the upwardly projection rear end portion 66 of the frame member section 62. The sections 57 and 63 are connected intermediate their ends by a platelike member 67 and are provided at their upper rear ends with handgrips 68. A crossbar 69 is welded at its opposite ends to the intermediate portions of the frame member sections 56 and 62, and is rigidly secured to the rear end portion 10 of the base member 11 by machine screws or the like 70. Thus, the frame members 54 and 55 aid in stiffening the mounting of the support means 21 to the base member 11.

The above-described mower is propelled over the ground by the motor 8 through the belt 40, and transmission gearing within the housing 12, and drive shaft 15, speed and direction of rotation of the wheels 17 being controlled by the shift lever 18, the speed of the motor being controlled by the usual throttle, not shown, but which in return is controlled by a hand lever 71, see particularly FIG. 2. The V-belt 41 is normally loosely entrained over the pulleys 39 and 42, so that the belt 41 slips with respect to either of the pulleys 39 and 42 whereby to operatively disengage the output shaft 48 and mower bar 4 from the motor 8. An idler roller 72 is journaled on one end of a lever 73 that is pivotally connected intermediate its ends to a bracket 74 welded or otherwise rigidly mounted on the frame member section 56. An elongated control rod 75 is pivotally connected at one end to the opposite end of the lever 73 and at its other end to a control lever 76 that is pivotally mounted to the rear end portion 59 of the frame member section 56, by means of a pivot bolt or the like 77. The control lever 76 is provided with a pin 78 that is movable between a recess 79 in a platelike member 80 welded or otherwise secured to the rear end portion 59 and a front edge portion of the platelike member 80 to hold the lever 76 selectively in positions wherein the idler roller 72 is in a belt-loosened or belt-tightened position relative to the belt 41. The arrangement is such that when the lever 76 is swung rearwardly or in an anticlockwise direction with respect to FIG. 2, the idler roller 72 will be brought into operative belt-tightening engagement with the belt 41, whereby to cause reciprocatory movement to be imparted to the mower bar 4 and sickle knives 5 carried thereby. A coil compression spring 81 on the pivot bolt 77 urges the control lever 76 toward reception of the pin 78 in the opening or recess 79 or between the lower end of the platelike member 80 and the adjacent portion of the frame member section 56.

The location of the motor 8 with respect to the transmission housing 12 and support means 21, together with the cutter assembly 1, provides for a well-balanced machine which may be easily controlled by an operator walking behind the machine. Further, by having the drive wheels directly connected to the drive shaft 15 and mounting the operating structure directly on the transmission housing, by means of the base member 11, a compact, lightweight and sturdy structure is provided. While I have shown and described a preferred embodiment of sickle bar mower, it will be understood that the same is capable of modification without departure from the spirit and scope of the invention, as defined in the claims.

What is claimed is:

1. A sickle bar mower comprising:
    a. a transmission housing,
    b. an input shaft journaled in said housing and projecting outwardly therefrom,
    c. a pair of aligned rotary drive shafts journaled in the housing and projecting outwardly from opposite sides thereof, said drive shafts being operatively connected to said input shaft within said housing,
    d. a pair of ground-engaging drive wheels each mounted on a different one of the drive shafts,
    e. a base member mounted on said transmission housing and having front and rear end portions disposed forwardly and rearwardly respectively of the housing,
    f. a drive motor mounted on said rear end portion of the base member,
    g. drive means connecting said drive motor to said input shaft,
    h. support means mounted on the front end portion of the base member and projecting forwardly therefrom,
    i. an output shaft journaled in the support means,
    j. drive connections between said input and output shaft, and
    k. mower structure carried by the support means and operatively connected to said output shaft.

2. The sickle bar mower defined in claim 1, characterized by a frame including a pair of laterally spaced frame members having front end portions secured to said support means and rear end portions providing handle means, said frame having an intermediate portion between said front and rear frame member end portions rigidly secured to said base member.

3. The sickle bar mower defined in claim 1 in which said output shaft extends in a forward and rearward direction of movement of the mower, and in which said support means comprises:
    a. a pair of opposed support members,
    b. a pair of mounting blocks mounted between said support members in spaced apart relationship axially of said output shaft,
    c. a tubular sleeve carried by said mounting blocks concentric with the output shaft, and
    d. bearings in said sleeve journaling said output shaft therein.

4. The sickle bar mower defined in claim 3 characterized by a platelike skid member having a tubular hanger concentric with said sleeve and journaled thereon between said mounting blocks, said mower structure being carried by said skid member for common pivotal movement therewith on the common axis of said sleeve and output shaft, said mower structure including a crank element mounted on said output shaft.

5. The sickle bar mower defined in claim 4 characterized by a frame including a pair of laterally spaced frame members having front end portions each secured to a different one of said opposed support members, and rear end portions providing handle means, said frame members being connected by a crossbar rigidly secured to the rear end portion of said base member.

6. The sickle bar mower defined in claim 1 in which said input shaft is disposed on a generally horizontal axis extending transversely of the direction of travel of the mower, said drive motor having a shaft parallel to said input shaft, said drive means including aligned rotary elements fixed on the motor and input shafts and an endless flexible drive member entrained over said rotary elements.

7. The sickle bar mower defined in claim 6 in which said output shaft is disposed on an axis extending generally longitudinally of the direction of travel of the mower, said drive connections comprising:
    a. an intermediate shaft,
    b. means journaling the intermediate shaft on an axis parallel to said input shaft,
    c. aligned rotary elements fixed on said input and intermediate shafts,
    d. an endless flexible drive member entrained over said last-mentioned rotary elements, and
    e. gearing connecting said intermediate shaft to said output shaft.